(12) United States Patent
Son et al.

(10) Patent No.: US 7,736,784 B2
(45) Date of Patent: Jun. 15, 2010

(54) INJECTION NOZZLE ASSEMBLY AND FUEL CELL SYSTEM HAVING THE SAME

(75) Inventors: In Hyuk Son, Yongin (KR); Zin Park, Yongin (KR); Ho Jin Kweon, Seoul (KR)

(73) Assignee: Samsung SDI Co., Ltd., Suwon-si (KR)

( * ) Notice: Subject to any disclaimer, the term of this patent is extended or adjusted under 35 U.S.C. 154(b) by 1130 days.

(21) Appl. No.: 11/367,206

(22) Filed: Mar. 3, 2006

(65) Prior Publication Data

US 2006/0196171 A1 Sep. 7, 2006

(30) Foreign Application Priority Data

Mar. 4, 2005 (KR) .................. 10-2005-17966

(51) Int. Cl.
*H01M 8/02* (2006.01)
*F01N 3/00* (2006.01)

(52) U.S. Cl. ........................................ 429/34
(58) Field of Classification Search .............. 429/34
See application file for complete search history.

(56) References Cited

U.S. PATENT DOCUMENTS

| | | | | |
|---|---|---|---|---|
| 4,728,584 | A * | 3/1988 | Isenberg | 429/31 |
| 6,585,940 | B2 * | 7/2003 | Abe et al. | 422/211 |
| 2003/0086834 | A1 * | 5/2003 | Rivin | 422/180 |
| 2004/0244290 | A1 * | 12/2004 | Yamamoto et al. | 48/127.9 |
| 2006/0172174 | A1 * | 8/2006 | Son et al. | 429/34 |

FOREIGN PATENT DOCUMENTS

| | | |
|---|---|---|
| JP | 2000-63105 | 2/2000 |
| JP | 2002025597 A * | 1/2002 |
| JP | 2003-48701 | 2/2003 |
| JP | 2004-193013 | 7/2004 |
| JP | 2004-286281 | 10/2004 |

OTHER PUBLICATIONS

Patent Abstracts of Japan, Publication No. 2000-063105; Publication Date: Feb. 29, 2000; in the name of Tachihara et al.
Patent Abstracts of Japan, Publication No. 2004-193013; Publication Date: Jul. 8, 2004; in the name of Wada et al.
Patent Abstracts of Japan, Publication No. 2004-286281; Publication Date: Oct. 14, 2004; in the name of Mizuno et al.
Patent Abstracts of Japan, Publication No. 2003-048701, dated Feb. 21, 2003, in the name of Tadao Yamamoto et al.

* cited by examiner

*Primary Examiner*—Gregg Cantelmo
(74) *Attorney, Agent, or Firm*—Christie, Parker & Hale, LLP

(57) ABSTRACT

An injection nozzle assembly for a fuel cell system, the injection nozzle assembly including a housing defining a fuel chamber to accommodate hydrogen-containing fuel therein and coated with a reforming catalytic layer. An inlet is provided in a first side of the housing to introduce the hydrogen-containing fuel in the fuel chamber and an outlet is provided in a second side of the housing to discharge the hydrogen-containing fuel from the fuel chamber. An injection means is provided in the fuel chamber so that noise, vibration and power consumption due to operation of a fuel pump are reduced, and transformation efficiency for producing hydrogen ions and electrons from the hydrogen-containing fuel is increased.

10 Claims, 8 Drawing Sheets

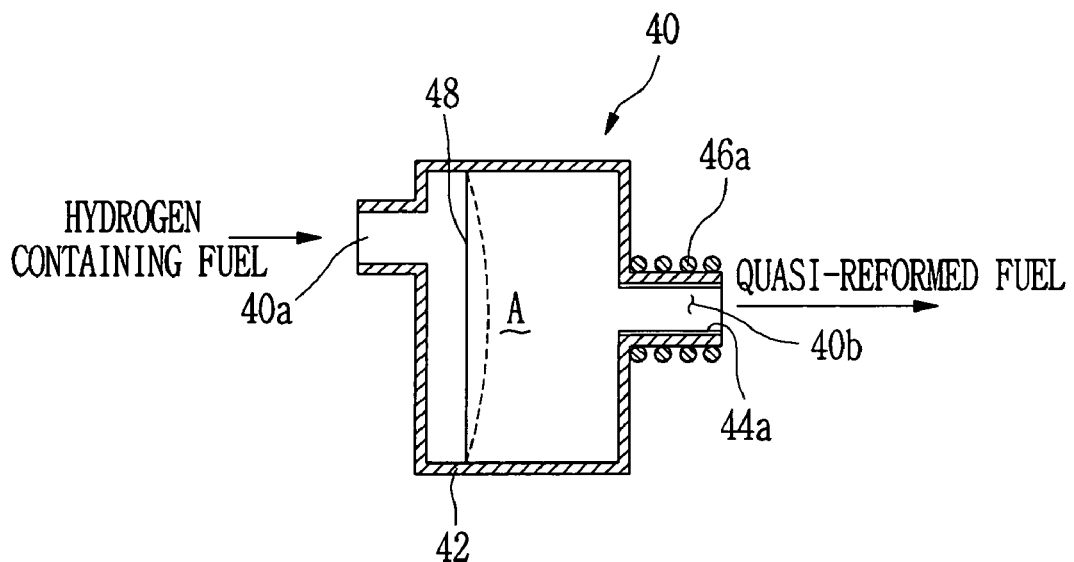
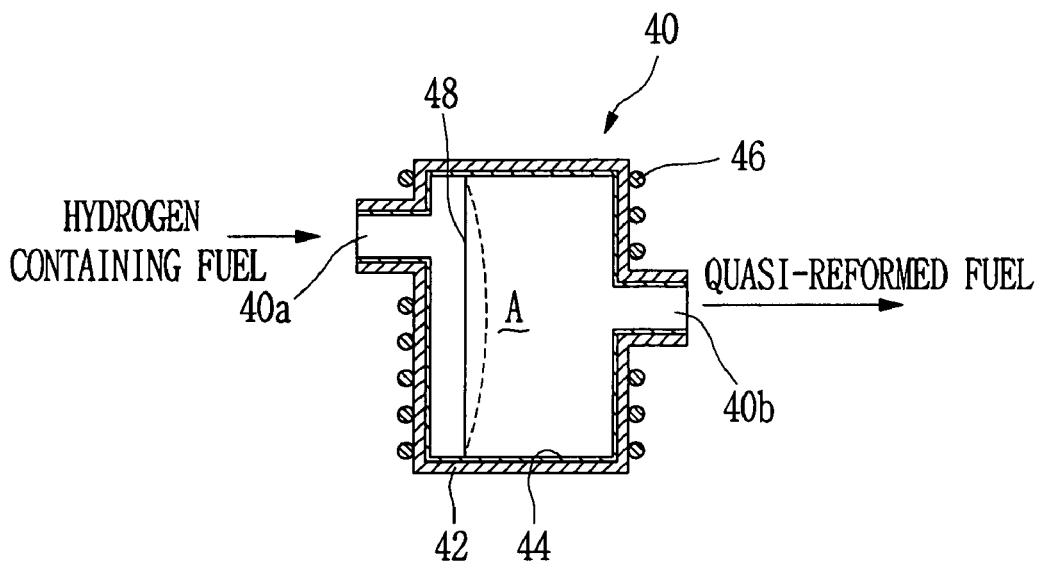

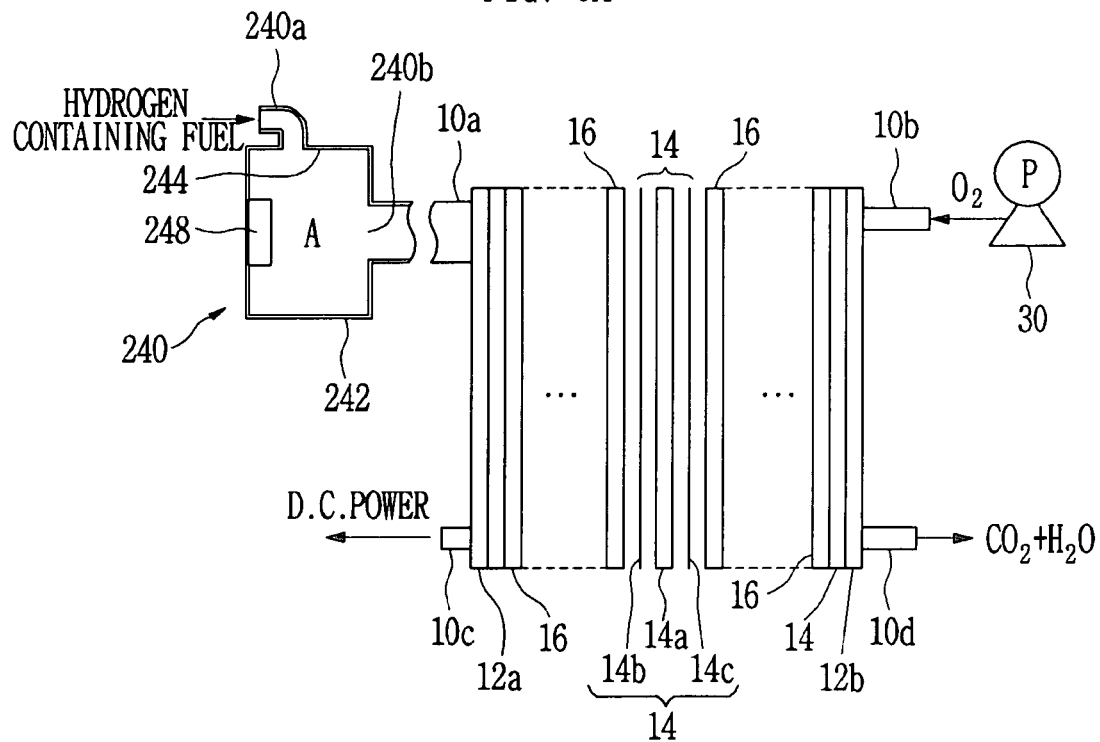
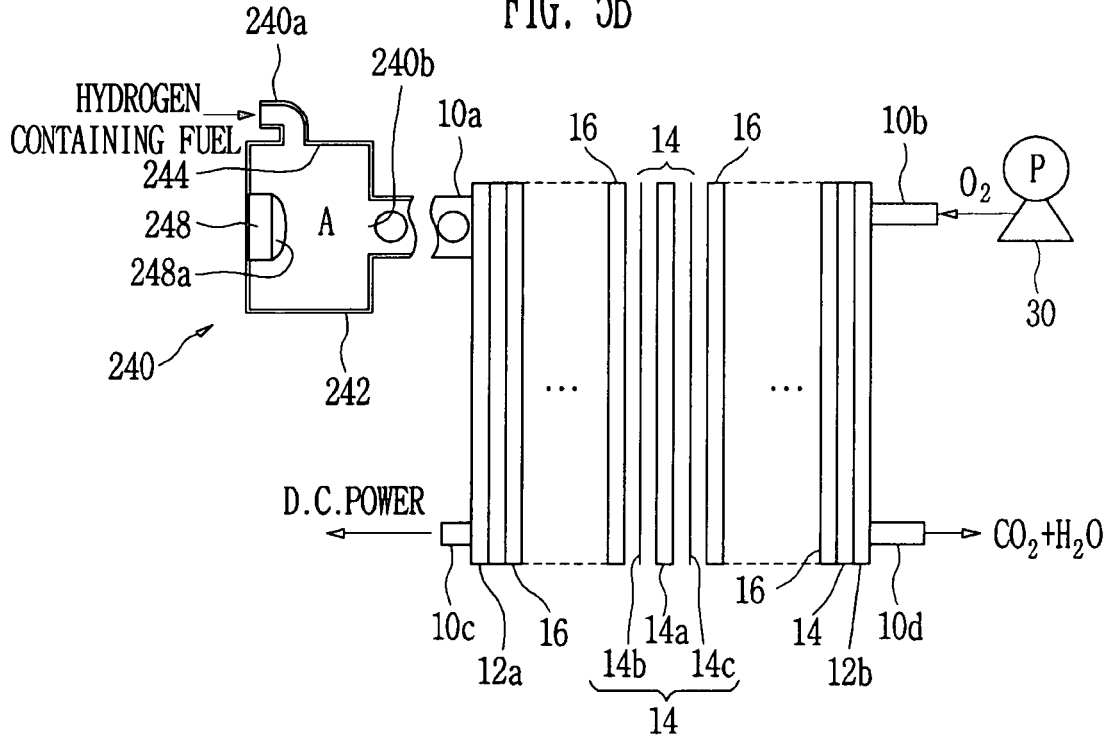

INJECTION NOZZLE ASSEMBLY AND FUEL CELL SYSTEM HAVING THE SAME

CROSS-REFERENCE TO RELATED APPLICATIONS

This application claims the benefit of Korean Patent Application No. 2005-17966, filed on Mar. 4, 2005, in the Korean Intellectual Property Office, the disclosure of which is incorporated herein by reference.

BACKGROUND

1. Field of the Invention

The present invention relates to fuel cell systems, and an injection nozzle assembly for the fuel cell system.

2. Discussion of Related Art

To solve environmental or lack of natural resources problems, much attention has been paid to a fuel cell that electrochemically reacts oxygen in air with hydrogen obtained from hydro-carbonaceous fuel such as natural gas or the like, or from hydrogen-containing fuel such as methanol or the like, thereby generating electricity. Such fuel cell is classified into a phosphoric acid fuel cell (PAFC), a molten carbonate fuel cell (MCFC), a solid oxide fuel cell (SOFC), a polymer electrolyte membrane fuel cell (PEMFC), an alkaline fuel cell (AFC), etc. according to the electrolyte used. These fuel cells may be applied to various fields such as a mobile device, transportation, a distributed power source, etc. according to a kind of fuel, a driving temperature, an output range, etc.

Among these fuel cells, the PEMFC is beneficial because it has excellent output performance, low operation temperature, and quick start and response. The PEMFC includes a stack in which a plurality of unit cells generating electricity based on a chemical reaction between hydrogen gas and oxygen gas are stacked and a reformer supplying hydrogen gas obtained by reforming hydrogen-containing fuel including a hydro-carbonaceous material such as methanol, ethanol or natural gas to the stack. The PEMFC also includes a fuel feeder for feeding the reformer with the hydrogen-containing fuel by a pumping operation and an air supplier for supplying air to the stack.

A direct methanol fuel cell (DMFC) has been developed that uses hydrogen-containing fuel directly to generate electricity without employing the reformer for obtaining hydrogen gas. The DMFC has advantages in that operation temperature is low, response time is short, and the size thereof is small. Therefore, the DMFC has been actively researched. The DMFC includes a stack in which a plurality of unit cells generating electricity based on an electrochemical reaction between hydrogen gas and oxygen gas are stacked. The DMFC also includes a fuel feeder for feeding the stack with hydrogen-containing fuel by a pumping operation; and an air supplier for supplying air to the stack.

In a conventional DMFC, the pumping operation is essential to supply hydrogen-containing fuel to the stack. However, the pumping operation causes noise, vibration and much power consumption. In particular, the DMFC has low transformation efficiency for obtaining hydrogen from the supplied hydrogen-containing fuel.

SUMMARY OF THE INVENTION

A fuel cell system is provided having an injection nozzle assembly in which the injection nozzle assembly includes an injection means for injecting hydrogen-containing fuel so as to have reduced noise, vibration and power consumption. The assembly also contains a fuel chamber internally coated with a reforming catalytic layer to increase transformation efficiency for producing hydrogen ions and electrons from the hydrogen-containing fuel.

The injection nozzle assembly includes a housing defining a fuel chamber to accommodate hydrogen-containing fuel therein; an inlet provided in a first side of the housing to introduce the hydrogen-containing fuel in the fuel chamber; an outlet provided in a second side of the housing to discharge the hydrogen-containing fuel from the fuel chamber; and an injection means provided in the fuel chamber.

A reforming catalytic layer may be coated on the inside of the housing or on the inside of the outlet. The injection means may be a vibration plate, a piezo actuator, a heater or a heating plate. Additionally, the housing is provided with a heating means to heat the hydrogen contained fuel stored in the fuel chamber.

The housing includes a connection pipe, and the injection means includes a heating plate allowing the hydrogen-containing fuel in the connection pipe to generate gas bubbles.

Another exemplary embodiment of the present invention includes a fuel cell system having a stack in which at least one unit cell generating electricity is stacked; a fuel storage tank storing hydrogen-containing fuel to be supplied to the stack; an air supplier for supplying air to the stack; and an injection nozzle assembly provided for fluid communication between the fuel storage tank and the stack. The injection nozzle assembly includes a housing defining a fuel chamber accommodating the hydrogen-containing fuel supplied from the fuel storage tank, the housing having a first side formed with an outlet through which the hydrogen-containing fuel accommodated in the fuel chamber is discharged. Additionally, an injection means is provided in the fuel chamber.

Still another exemplary embodiment of the present invention includes a fuel cell system having a fuel storage tank storing hydrogen-containing fuel; a membrane electrode assembly including a polymer membrane having opposite sides provided with first and second catalytic layers; and a fuel feeder provided for fuel communication between the fuel storage tank and the first catalytic layer formed in one side of the polymer membrane. The fuel feeder includes an injection nozzle assembly as described above.

According to an exemplary embodiment of the invention, a first catalyst layer coated on a first side of the polymer membrane is used as an anode electrode, and the second catalyst layer coated on a second side thereof is used as a cathode electrode. The second catalyst layer may be exposed to air or provided with an air supplier.

BRIEF DESCRIPTION OF THE DRAWINGS

FIGS. 1A and 1B are sectional views illustrating injection nozzle assemblies according to an embodiment of the present invention.

FIGS. 5A and 5B illustrate that the injection nozzle assembly according to a second embodiment of the present invention is connected to the stack.

DETAILED DESCRIPTION

Figure 2:
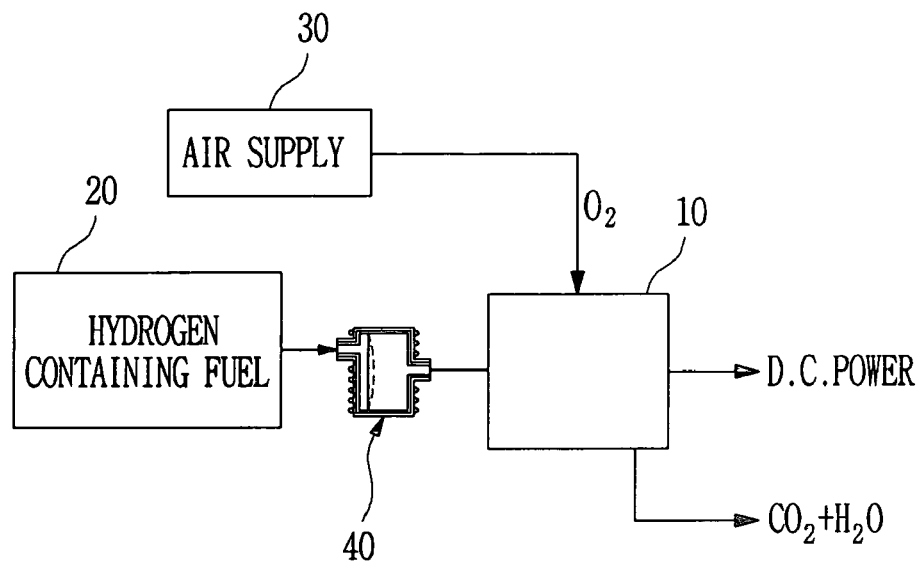
FIG. 2 is a block diagram illustrating a reforming catalyst coating injection nozzle assembly installed in a DMFC according to an embodiment of the present invention.

As shown in FIGS. 1A and 1B, an injection nozzle assembly 40 includes a housing 42 to define a fuel chamber A to accommodate hydrogen-containing fuel. The housing 42 has a first side formed with an inlet 40a to introduce hydrogen-containing fuel from the outside into the fuel chamber A and a second side formed with an outlet 40b to discharge the hydrogen-containing fuel from the fuel chamber A.

To discharge the hydrogen-containing fuel from the fuel chamber A through the outlet 40b, the fuel chamber A is provided with an injection means. The injection means may include a vibration plate 48 (FIGS. 1 and 3) which is vibrated by external power.

The vibrating plate 48 may be arched toward the outlet 40b when external power is supplied to it (FIGS. 1A and 1B). When the vibration plate is vibrated, the hydrogen-containing fuel accommodated in the fuel chamber A adjacent to the outlet 40b, i.e., an outlet side of the vibration plate 48, is moved toward the outlet 40b and discharged. Simultaneously, hydrogen-containing fuel is introduced from the fuel storage tank 20 through an inlet side of the vibration plate 48, i.e., through the inlet 40a. The amount of hydrogen-containing fuel introduced from the inlet 40a into the fuel chamber A is proportional to the amount of hydrogen-containing fuel discharged through the outlet 40b.

When the external power is off, the vibration plate 48 is in an unarched state and hydrogen-containing fuel introduced through the inlet side of the vibration plate 48 is moved toward the outlet side of the vibration plate 48 through a bypass channel (not shown), thereby being accommodated in the fuel chamber A.

As the power alternates between on and off, the vibration plate 48 vibrates, and correspondingly the hydrogen-containing fuel accommodated in the fuel chamber A is controlled to flow through the outlet 40.

In one exemplary embodiment, the interior of the outlet 40b, as shown in FIG. 1A, is coated with a first reforming catalytic layer 44a to quasi-reform the hydrogen-containing fuel discharged from the fuel chamber A through the outlet 40b, thereby facilitating generation of the hydrogen ion and the electrons from the hydrogen fuel cell in the following process. As used herein, a "quasi-reformed state" means a state in which hydrogen-containing fuel has been processed to facilitate generation of hydrogen ions and electrons. As the vibration plate 48 is vibrated, the quasi-reformed hydrogen-containing fuel is discharged from the fuel chamber A through the outlet 40b. A heating means 46a may be provided around the outlet 40b to heat the hydrogen-containing fuel discharged through the outlet 40b, thereby facilitating the quasi-reforming transformation using the first reforming catalytic layer 44a of the outlet 40b.

To further facilitate the generation of the hydrogen ion and the electrons by the oxidation reaction of the hydrogen fuel cell, as shown in FIG. 1B, the inside of the housing 42 may be coated with a second reforming catalytic layer 44 to transform the hydrogen-containing fuel accommodated in the fuel chamber A into a quasi-reforming state. As the vibration plate 48 is vibrated, hydrogen-containing fuel transformed into a quasi-reforming state is discharged as a quasi-reformed fuel through the outlet 40b of the housing 42.

The first reforming catalytic layer 44a and the second reforming catalytic layer 44 are formed by coating the insides of the outlet 40b and the housing 42 respectively, with at least one catalytic material selected from a noble metal catalytic material such as Pt, Pd, Ru, Rh or Ir, or from a base metal catalytic material such as Cu, Cr, Mo, W or Co.

A heating means 46 may be provided around the housing 42 to heat the hydrogen-containing fuel accommodated in the fuel chamber A, thereby facilitating the quasi-forming transformation using the second reforming catalytic layer 44 of the fuel chamber A. The heating means 46, 46a may be configured as a hot wire or the like surrounding the housing and the outlet 40b, but not limited to.

Figure 4A:
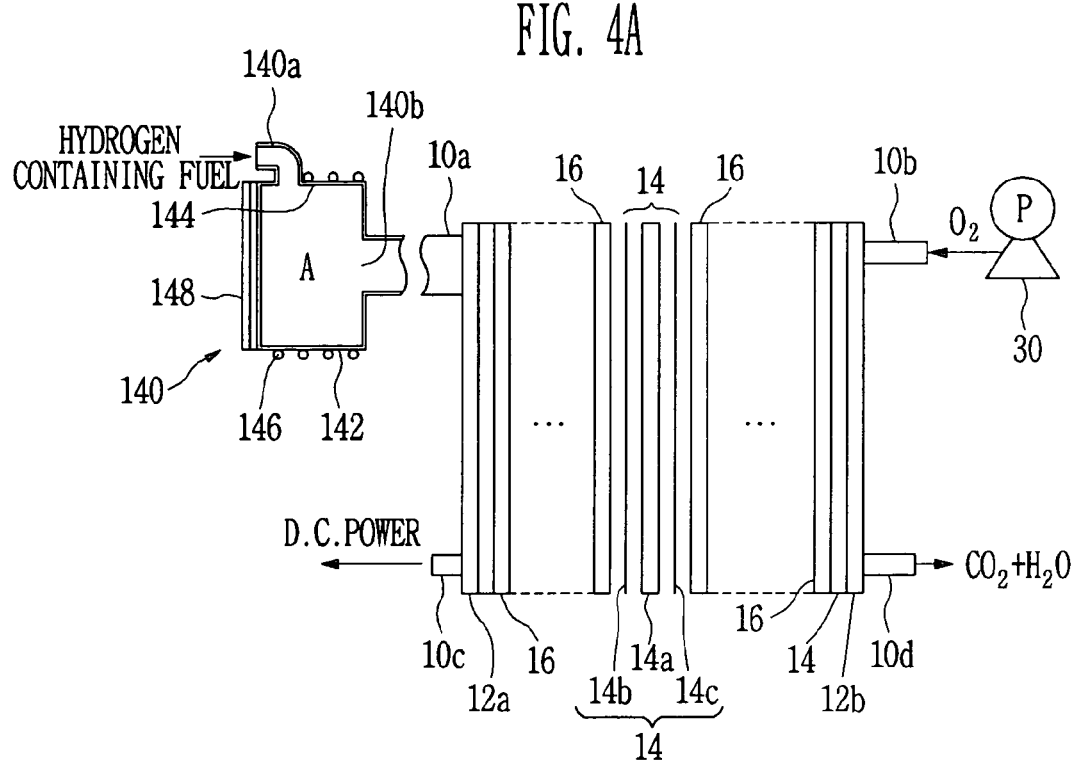
FIGS. 4A and 4B illustrate that the injection nozzle assembly according to a first embodiment of the present invention is connected to the stack.
Figure 4B:
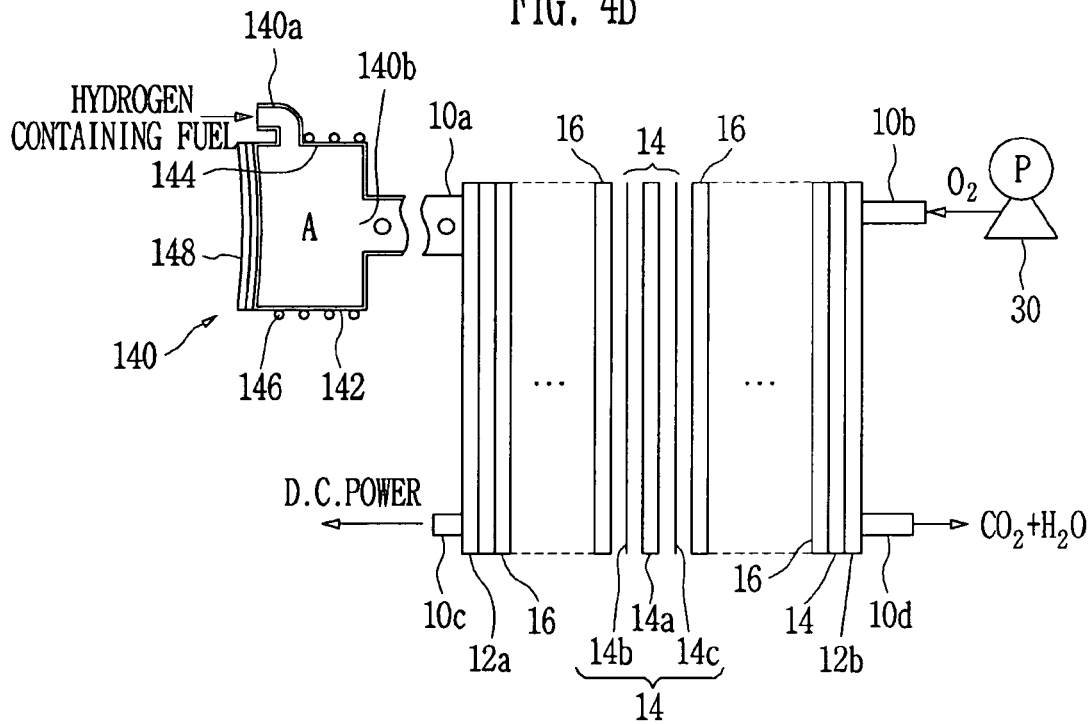

Referring to FIGS. 4A and 4B, an injection nozzle assembly 140 may employ a piezo-actuator 148 as the injection means. The piezo-actuator 148 is deformed as external power is applied thereto, allowing hydrogen-containing fuel in the quasi-reforming state to be discharged from the fuel chamber A through the outlet 140b. The amount of hydrogen-containing fuel introduced into the fuel chamber A through the inlet 140a is proportional to the amount of hydrogen-containing fuel discharged through the outlet 140b.

Referring to FIGS. 5A and 5B, an injection nozzle assembly 240 may employ a heater 248 as the injection means. The heater 248 is heated when external power is applied thereto, generating gas bubbles 248a in the hydrogen-containing fuel accommodated in the fuel chamber A. Due to the expansion of the gas bubbles 248a, the hydrogen-containing fuel accommodated in the fuel chamber A in a quasi-reforming state is discharged through the outlet 240b. Here, the amount of the hydrogen-containing fuel introduced into the fuel chamber A through the inlet 240a is proportional to the amount of the hydrogen-containing fuel discharged through the outlet 240b.

Figure 6A:
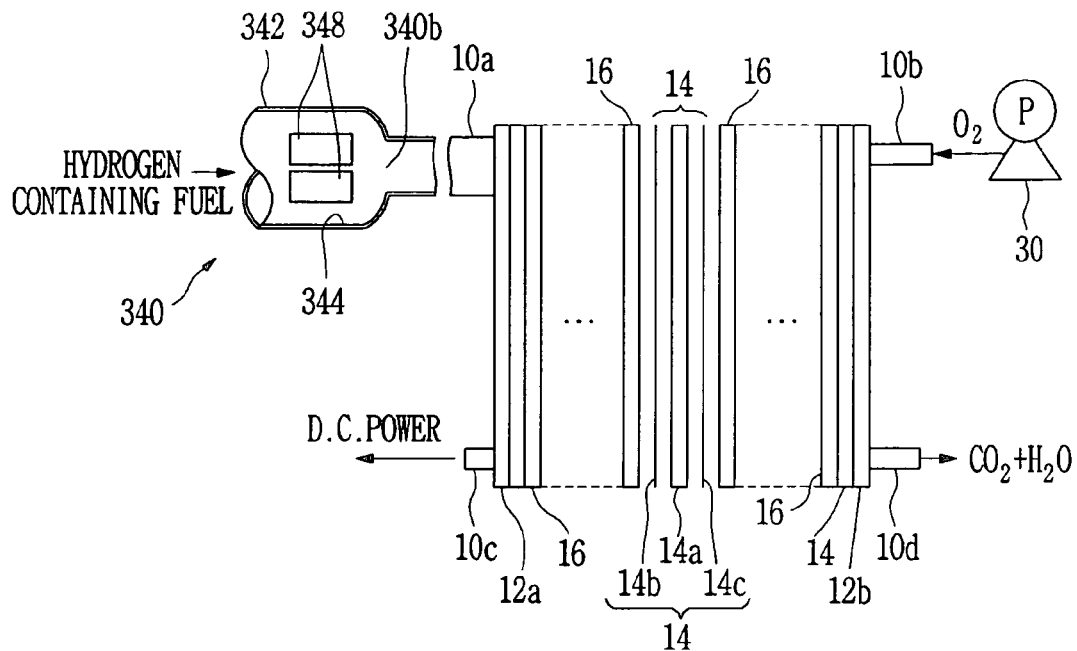
FIGS. 6A, 6B and 6C illustrate that the injection nozzle assembly according to a third embodiment of the present invention is connected to the stack.
Figure 6B:
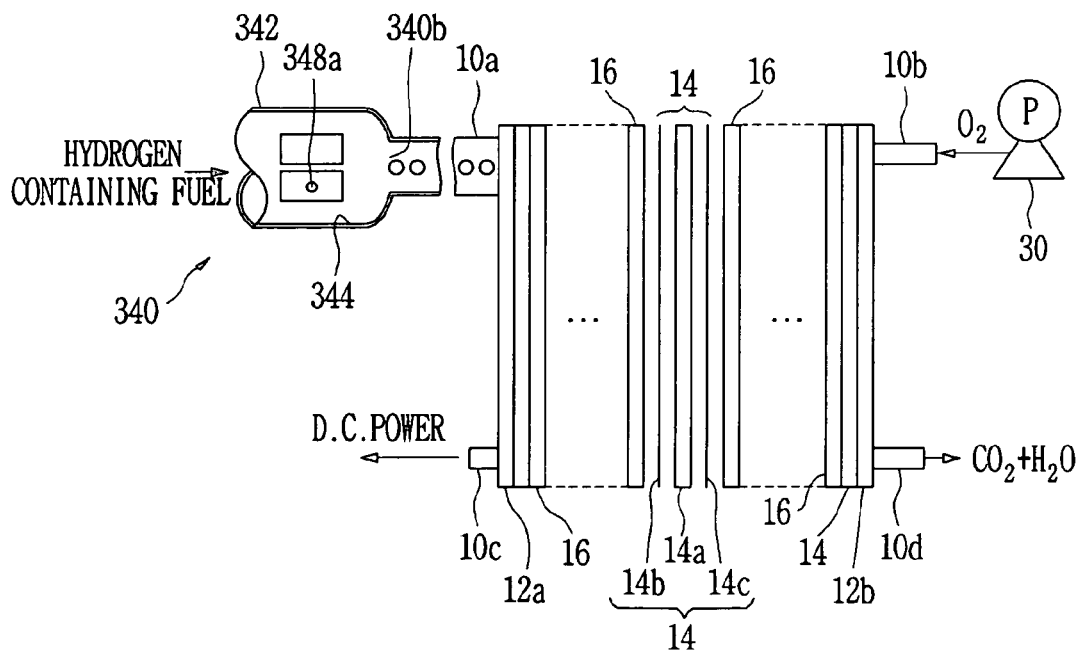
Figure 6C:
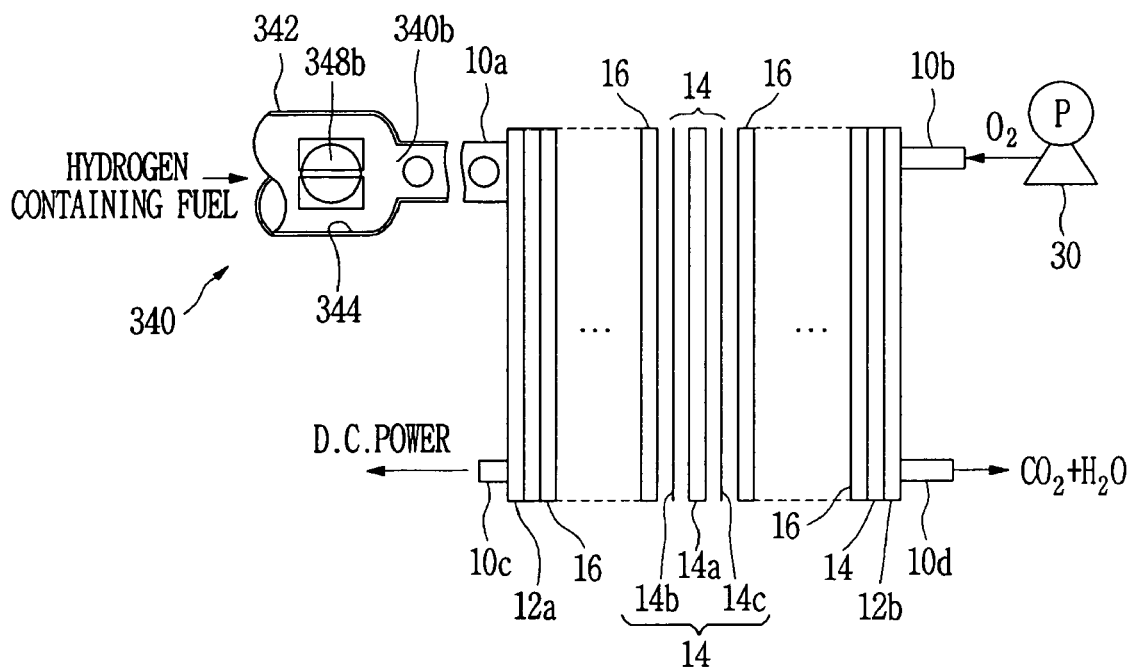

Referring to FIGS. 6A through 6C, an injection nozzle assembly 340 may employ a heating plate 348 as the injection means. The heating plate 348 is heated when external power is applied thereto, generating gas bubbles 348a, 348b in the hydrogen-containing fuel. Therefore, the hydrogen-containing fuel discharged through the outlet 340b proportionally to the volume of the generated gas bubbles 348a, 348b. The discharged hydrogen-containing fuel is reformed by the reforming catalytic layer 344 to have a quasi-reforming state. On the other hand, when the heating plate 348 is cooled, the hydrogen-containing fuel is introduced from outside, for example a fuel storage tank 20 proportionally to the reduced volume thereof.

According to an exemplary embodiment of the present invention, the fuel cell system including the injection nozzle assembly 40, 140, 240, or 340 may be applied to the DMFC that directly supplies hydrogen-containing fuel including a hydro-carbonaceous material such as methanol, ethanol, natural gas, etc. to the stack to generate electricity. In general, DMFCs are classified into active fuel cells including a stack in which a plurality of unit cells are stacked, and passive fuel cells including a plurality of unit cells unfolded on a plane. Below, configuration and operation of the respective active and passive fuel cells will be described.

According to an embodiment of the present invention, as shown in FIGS. 2 through 6, an active fuel cell includes a fuel storage tank 20 for storing the hydrogen-containing fuel to be supplied to the stack 10 and an air supplier 30 such as an air pump for supplying air to the stack 10.

Figure 3:
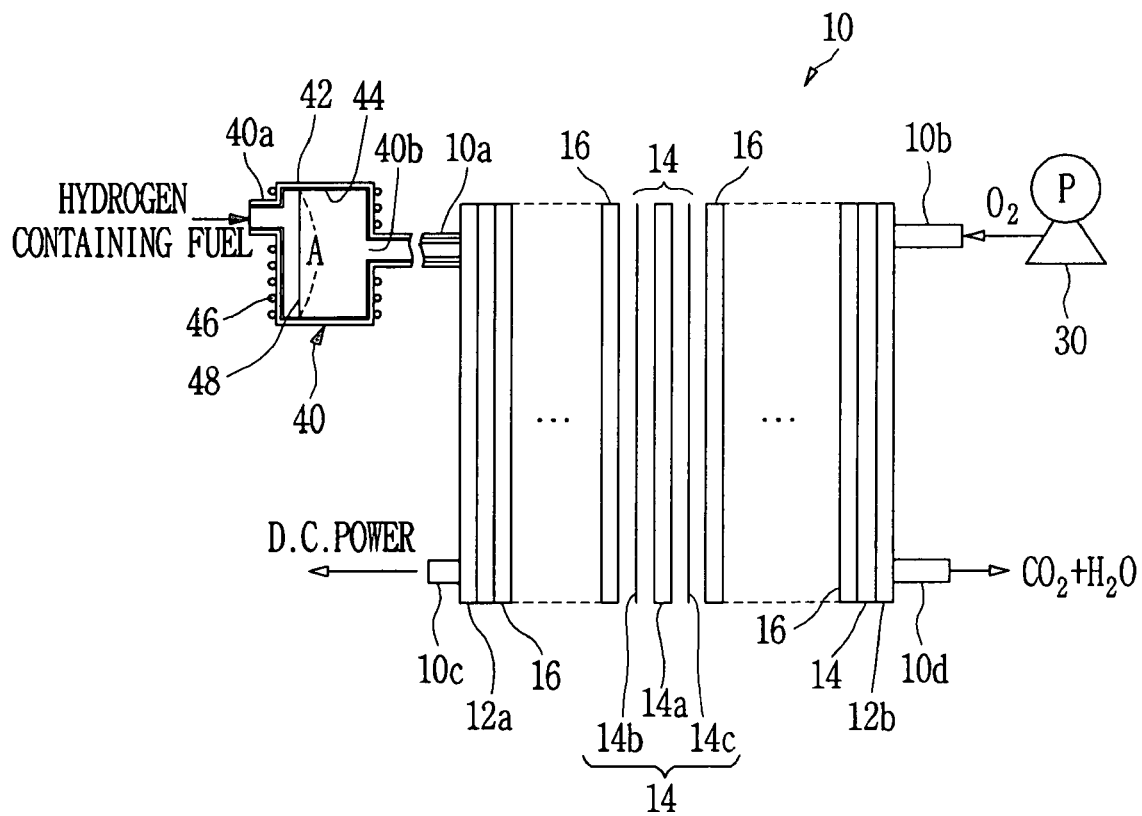
FIG. 3 is a detail view of a stack in a fuel cell system according to an embodiment of the present invention.

Referring to FIG. 3, the stack 10 is provided with a plurality of unit cells including a membrane electrode assembly (MEA) 14 having a polymer membrane 14a and electrodes 14b, 14c provided on opposite sides of the polymer membrane 14a, and division plates provided on opposite sides of the MEA 14 to supply hydrogen gas and oxygen gas. The division plate may be a bipolar plate 16, which is interposed between neighboring MEAs 14, the bipolar plate 16 having a first side formed with a channel for supplying hydrogen-containing fuel and a second side formed with a channel for supplying oxygen gas, but not limited to.

In the MEA 14, the electrodes include an anode electrode 14b generating hydrogen ions ($H^+$) and electrons ($e^-$) in the oxidation process of the hydrogen-containing fuel, for example methanol, and a cathode electrode generating water in the reduction process of oxygen. Specifically, the anode electrode 14b includes a catalytic layer to produce hydrogen ions and electrons in the oxidation process of the hydrogen-containing fuel flowing through the channel formed in the first side of the bipolar plate 16, and a gas diffusion layer (GDS) to uniformly disperse the hydrogen-containing fuel on the catalytic layer and eject carbon dioxide generated by the oxidation process of the hydrogen gas. Similarly, the cathode electrode 14c includes a catalytic layer to facilitate a chemical reaction between oxygen in air supplied through the channel formed in the second side of the bipolar plate and hydrogen ion produced in the anode electrode 14a, and a gas diffusion layer (GDS) to uniformly disperse the oxygen on the catalytic layer and eject water generated through the chemical reaction.

The polymer membrane 14a is a conductive polymer electrolyte membrane having a thickness of about 50 μm to 200 μm and which has an ion exchange function to transfer hydrogen ions generated in the catalytic layer of the anode electrode 14b to the catalytic layer of the cathode electrode 14c. Examples of polymer membranes 14a include a perfluorinated fluoric acid resin membrane made of perfluorosulfonate resin (Nafion®), a membrane formed by coating a porous polytetrafluoroethylene thin film support with resin solution such as perfluorinated sulfonic acid or the like, and a membrane formed by coating a porous non-conductive polymer support with a positive ion exchange resin and inorganic silicate, etc.

The first side of the anode electrode 14b and the cathode electrode 14c face the bipolar plate 16 to supply hydrogen-containing fuel and oxygen, respectively. The first side of the bipolar plate 16 facing the anode electrode 14b is formed with a fuel inlet and a fuel channel into which the hydrogen-containing fuel is introduced. The second side of the bipolar plate 16 facing the cathode electrode 14c is formed with an oxygen inlet and an oxygen channel into which oxygen in air is introduced.

The stack 10 also includes end plates 12a, 12b. The surfaces of the end plates 12a, 12b facing the anode electrode 14b and the cathode electrode 14c are formed with a fuel channel and an oxygen channel to transport hydrogen-containing fuel and oxygen therethough, respectively. The side of the first end plate 12a facing the anode electrode 14b includes a first inlet 10a through which hydrogen-containing fuel is introduced, and an output terminal 10c for supplying direct current (DC) power resulting from the electrochemical reaction in the unit cells to the outside. Likewise, the side of the second end plate 12b facing the cathode electrode 14c includes a second inlet 10b through which air is introduced, and a discharging portion 10d for discharging carbon dioxide ($CO_2$) and water ($H_2O$) resulting from the electro-chemical reaction in the unit cells to the outside.

In the stack 10, the fuel inlet formed in the first side of the bipolar plate forming a first unit cell is connected to and communicates hydrogen-containing fuel with the fuel inlet formed in the first side of the bipolar plate formed in a second unit cell. Similarly, the oxygen inlet formed in the second side of the bipolar plate forming a first unit cell is connected to and communicates oxygen gas with the oxygen inlet formed in the second side of the bipolar plate formed in a second unit cell. Further, the first and second inlets 10a,10b each formed in the end plates 12a, 12b are connected to and communicate fuel and oxygen gas with the fuel inlet formed in the first side of the bipolar plate and the oxygen inlet formed in the second side of the bipolar plate forming adjacent unit cells, respectively.

The active fuel cell further includes an injection nozzle assembly 40, 140, 240 or 340 that is provided in front of the first inlet 10a formed in the first end plate 12a and injects the hydrogen-containing fuel stored in the fuel chamber A to the first inlet 10a. The injection nozzle assembly 40, 140, 240 or 340 includes injection means 48, 148, 248 or 348, respectively, to be described later, but not limited to.

In the injection nozzle assembly 40, 140, 240 or 340, the first reforming catalytic layer may be coated, for example, on only the outlet thereof as shown in FIG. 1A.

Referring to FIG. 3, the injection nozzle assembly 40 has a first side formed with an inlet 40a connected to and communicating with the fuel storage tank 20 (FIG. 2), and has a housing 42 defining a fuel chamber A accommodating the hydrogen-containing fuel supplied from the fuel storage tank 20 through the inlet 40a. The inside of the housing 42 is coated with the reforming catalytic layer 44 for transforming the hydrogen-containing fuel accommodated in the fuel chamber A to have a quasi-reformed state. Further, the housing 42 is provided with the heating means 46 to heat the hydrogen-containing fuel accommodated in the fuel chamber A.

The fuel chamber A employs a vibration plate 48 as the injection means which is vibrated by the external power. Additionally, the fuel chamber A is formed with an outlet 40b facing the vibration plate 48 to discharge the hydrogen-containing fuel toward the first inlet 10a of the first end plate 12a.

Therefore, when an electric signal is transmitted from a controller (not shown) to the vibration plate 48, the vibration plate 48 is vibrated to discharge hydrogen-containing fuel accommodated in the fuel chamber A toward the first inlet 10a of the stack 10 through the outlet 40b. Thus, hydrogen-containing fuel is supplied to the inside of the stack 10. As the hydrogen-containing fuel is discharged, the hydrogen-containing fuel is supplied from the fuel storage tank 20 to the fuel chamber A by capillary and inertia effects or the like proportionally to the amount of discharged hydrogen-containing fuel.

The hydrogen-containing fuel maintained in the quasi-reformed state is supplied to the inside of the stack 10 so that hydrogen ions and the electrons may be easily generated in the oxidation process of the quasi-reformed fuel. Further, when the controller turns on the heating means 46, the hydrogen-containing fuel accommodated in the fuel chamber A is heated, thereby further facilitating the quasi-reforming transformation by the reforming catalytic layer 44.

Referring to FIGS. 4A and 4B, the injection nozzle assembly 140 provided in front of the first inlet 10a of the stack 10 has a first side formed with an inlet 140a connected to and communicating with the fuel storage tank 20 (refer to FIG. 2), and has a housing 142 defining a fuel chamber A accommodating the hydrogen-containing fuel supplied from the fuel storage tank 20 through the inlet 140a. The inside of the housing 142 is coated with the reforming catalytic layer 144 for transforming the hydrogen-containing fuel accommodated in the fuel chamber A into the quasi-reformed state. Further, the housing 142 is provided with heating means 146 to heat the hydrogen-containing fuel accommodated in the fuel chamber A. Also, a piezo actuator 148 is provided in a first side of the housing 142 as the injection means. Further, a second side of the housing 142 has an outlet 140b opposite the piezo actuator 148 for discharging the hydrogen-containing fuel toward the first inlet 10a of the first end plate 12a.

Therefore, when an electric signal is transmitted from the controller (not shown) to the piezo-actuator 148, the piezo-actuator 148 is deformed so that the hydrogen-containing fuel accommodated in the fuel chamber A is discharged through the outlet 140b and supplied to the inside of the stack 10 via the first inlet 10a of the stack 10. Further, when the hydrogen-containing fuel is discharged, the hydrogen-containing fuel is supplied from the fuel storage tank 20 to the fuel chamber A by capillary and inertia effects or the like proportionally to the amount of discharged hydrogen-containing fuel.

Hydrogen-containing fuel maintained in the quasi-reformed state is supplied to the inside of the stack 10 so that hydrogen ions and the electrons may be easily generated during the oxidation process of the quasi-reformed fuel in the stack 10. Further, when a controller turns on heating means 146, the hydrogen-containing fuel accommodated in the fuel chamber A is heated, thereby further facilitating the quasi-reforming transformation by the reforming catalytic layer 144. As described above, injection using the piezo actuator allows the amount of liquid fuel injected to be precisely controlled by electric current control. Also, when gas bubbles are created in the hydrogen-containing fuel, the size of gas bubbles may be adjusted by varying a control time of the electric current of the piezo actuator 148.

Referring to FIGS. 5A and 5B, the injection nozzle assembly 240 provided in front of the first inlet 10a of the stack 10 has a first side formed with an inlet 240a connected to and communicating with the fuel storage tank 20 (refer to FIG. 2), and has a housing 242 defining a fuel chamber A accommodating the hydrogen-containing fuel supplied from the fuel storage tank 20 through the inlet 240a. The inside of the housing 242 is coated with a reforming catalytic layer 244 for transforming hydrogen-containing fuel accommodated in the fuel chamber A into the quasi-reformed state.

Further, a heater 248 is provided in a first side of the housing 242 and employed as an injection means. Also, a second side of the housing 242 is formed with an outlet 240b opposite to the heater 248 for discharging the hydrogen-containing fuel toward the first inlet 10a.

Therefore, when an electric signal is transmitted from the controller to the heater 248, the heater 248 is quickly heated to generate gas bubbles 248a in the hydrogen-containing fuel accommodated in the fuel chamber A. Due to the expansion of the gas bubbles 248a, the hydrogen-containing fuel is discharged toward the first inlet 10a through the outlet 240b. Thus, the injected liquid fuel is supplied to the inside of the stack 10 via the first inlet 10a of the stack 10. Further, when the gas bubbles condense after the hydrogen-containing fuel is discharged, the hydrogen-containing fuel is introduced from the fuel storage tank 20 into the fuel chamber A through the inlet 240a proportionally to the amount of the discharged hydrogen-containing fuel.

The hydrogen-containing fuel supplied to the inside of the stack 10 is maintained in the quasi-reformed state so that hydrogen ions and the electrons may be easily generated during the oxidation process of the quasi-reformed fuel. In particular, the heater 248, heated by external power supplied by the controller, heats the hydrogen-containing fuel accommodated in the fuel chamber A, thereby further facilitating the quasi-reforming transformation due to the reforming catalytic layer 244.

Referring to FIG. 6A through 6c, the injection nozzle assembly 340 provided in front of the first inlet 10a of the stack 10 includes a connection pipe 342 connecting the fuel storage tank 20 with the first inlet 10a of the stack 10 without a separate fuel chamber. The connection pipe 342 employs a heating plate 348 as the injection means. Further, the inside of the connection pipe 342 is coated with a reforming catalytic layer 344 to transform the hydrogen-containing fuel into the quasi-reformed state. Therefore, when an electric signal is transmitted from the controller to the heating plate 348, the heating plate 348 is heated, generating gas bubbles 348a, 348b in the hydrogen-containing fuel. The hydrogen-containing fuel is discharged through the outlet 340b proportionally to the volume of the generated gas bubbles 348a, 348b. On the other hand, as the heating plate 348 cools when the external power is off, hydrogen-containing fuel is introduced from the fuel storage tank 20 to the inside of the connection pipe 242 proportionally to the reduced volume thereof. Thus, hydrogen ions and the electrons may be easily generated during the oxidation process of the quasi-reformed fuel.

Below, operation of a DMFC having a stacked type stack according to another exemplary embodiment of the present invention will be described.

The injection nozzle assembly 40, 140, 240 or 340 is provided in front of the first inlet 10a of the stack 10 having one or more unit cells. The injection nozzle assembly 40, 140, 240 or 340 is connected to and communicates with the fuel storage tank 20 storing the hydrogen-containing fuel, for example methanol. Further, the injection nozzle assembly 40, 140, 240 or 340 includes injection means such, for example, as the vibration plate 48, the piezo actuator 148, the heater 248, or the heating plate 348. The second inlet 10b of the stack 10 is connected to and communicates with the air supplier, e.g., an air pump 30.

As the injection means 48, 148, 248 or 348 is operated, the methanol accommodated in a fuel chamber A is injected to the first inlet 10a of the stack 10 through the outlet 40b, 140b, 240b or 340b of the injection nozzle assembly 40, 140, 240 or 340. Meanwhile, methanol introduced in the fuel chamber A of the injection nozzle assembly is reformed into the quasi-reformed state by the first reforming catalytic layer and/or the second reforming catalytic layer 44, 144, 244 or 344.

The methanol in the quasi-reformed state is supplied to the anode electrode 14b of the MEA 14 through the fuel inlet (not shown) and the fuel channel (not shown) formed in the first side of the bipolar plate 16 as well as the fuel channel formed in the first end plate 12a. Thereafter, hydrogen ions (protons) and electrons may be easily generated from the methanol by the following oxidation (1) in the catalytic layer of the anode electrode 14b.

$$CH_3OH + H_2O \rightarrow CO_2 + 6H^+ + 6e^- \qquad (1)$$

As the air pump 30 is operated, oxygen in air introduced to the second inlet 10b of the stack 10 is supplied to the cathode electrode 14c of the MEA 14 through the oxygen inlet (not shown) and the oxygen channel (not shown) formed in the second side of the bipolar plate 16 as well as the oxygen channel formed in the second end plate 12b.

Hydrogen ions generated in the anode electrode 14b are transferred to the cathode electrode 14c through the polymer membrane 14a and reacted with the oxygen in the cathode electrode 14c through the following oxygen reduction (2), thereby generating water:

$$O_2(g) + 4H^+ + 4e^- \rightarrow 2H_2O(g) \qquad (2)$$

The generated water along with carbon dioxide or the like generated in the stack 10 is discharged to the outside through the discharging portion 10d provided in the second end plate 12b. Further, the electrons generated in the anode electrode 14b are collected in an electric collector (not shown), and then discharged to the outside through the output terminal 10c provided in the first end plate 12a.

Figure 7:
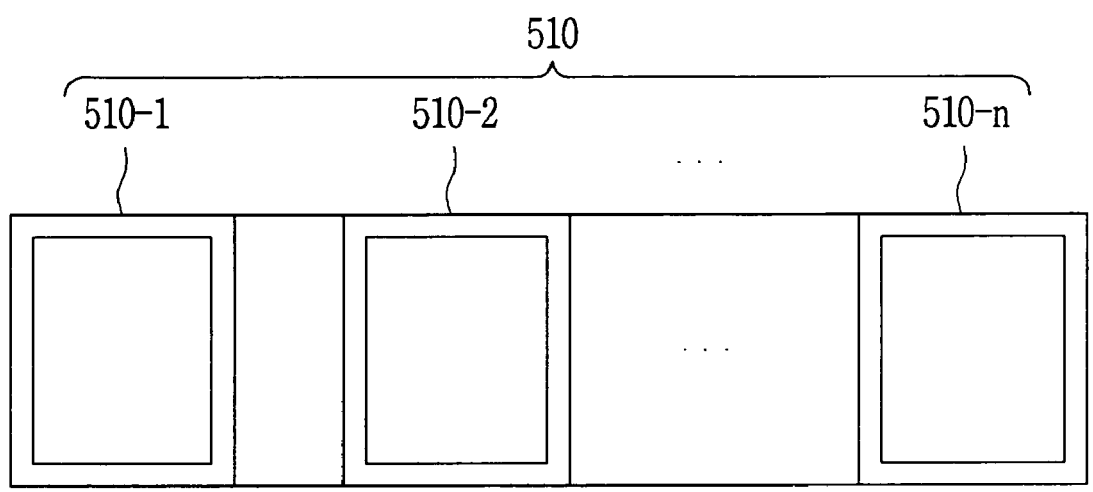
FIG. 7 is a plan view of the injection nozzle assembly according to an embodiment of the present invention connected to a passive fuel cell.

According to another embodiment of the present invention, the passive fuel cell including a plurality of unit cells unfolded on a plane will be described below with reference to FIGS. 7 through 9.

In the passive fuel cell, membrane electrode assemblys (MEAs) 514 having a polymer membrane 514a and catalytic layers provided on opposite sides of the polymer membrane 514a are unfolded on the plane. A first catalytic layer provided in a first side of the polymer membrane 514a is employed as an anode electrode 514b, and a second catalytic layer provided in a second side of the polymer membrane 514a is employed as a cathode electrode 514c. Here, the cathode electrode 514c of the MEA 514 is exposed to oxygen on one side thereof, and the anode electrode 514b of the MEA 514 is exposed to hydrogen-containing fuel, thereby forming one unit cell 510-1.

The first side of the cathode electrode 514c may be in contact with an oxygen supply (not shown) or an air supplier for supplying oxygen thereto. Further, neighboring unit-cells are electrically connected to each other by a conductive material (not shown). Also, the passive fuel cell 510 includes an electric collector (not shown) to collect electricity generated by the respective unit cells, thereby achieving a predetermined output through the electric collector.

Figure 8:
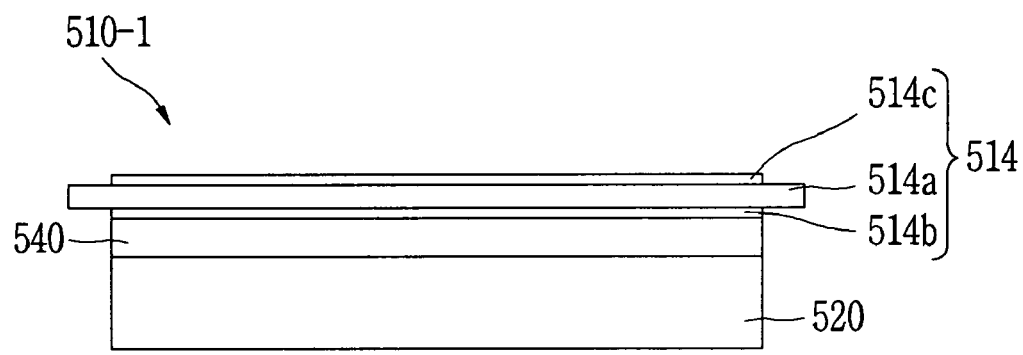
FIG. 8 is a side view of the injection nozzle assembly according to an embodiment of the present invention connected to a passive fuel cell.

Referring to FIG. 8, in one unit cell 510-1 of the passive fuel cell 510, the surface of the cathode electrode 514c provided in the second side (e.g., the top surface) of the MEA 514 is exposed to air, and the surface of the anode electrode 514b provided in the first side (e.g., the bottom surface) of the MEA 514 is in contact with a first side of a fuel feeder 540. A fuel storage tank 520 storing the hydrogen-containing fuel, for example methanol is provided in a second side of the fuel feeder 540.

Hydrogen ions and electrons are produced from the methanol by the foregoing oxidation (1) in the anode electrode 514b. The cathode electrode 514c reduction-reacts oxygen in air with hydrogen ions transferred from the anode electrode 514b to the polymer membrane 51a, thereby generating water as shown in the foregoing oxygen reduction (2).

Figure 9:
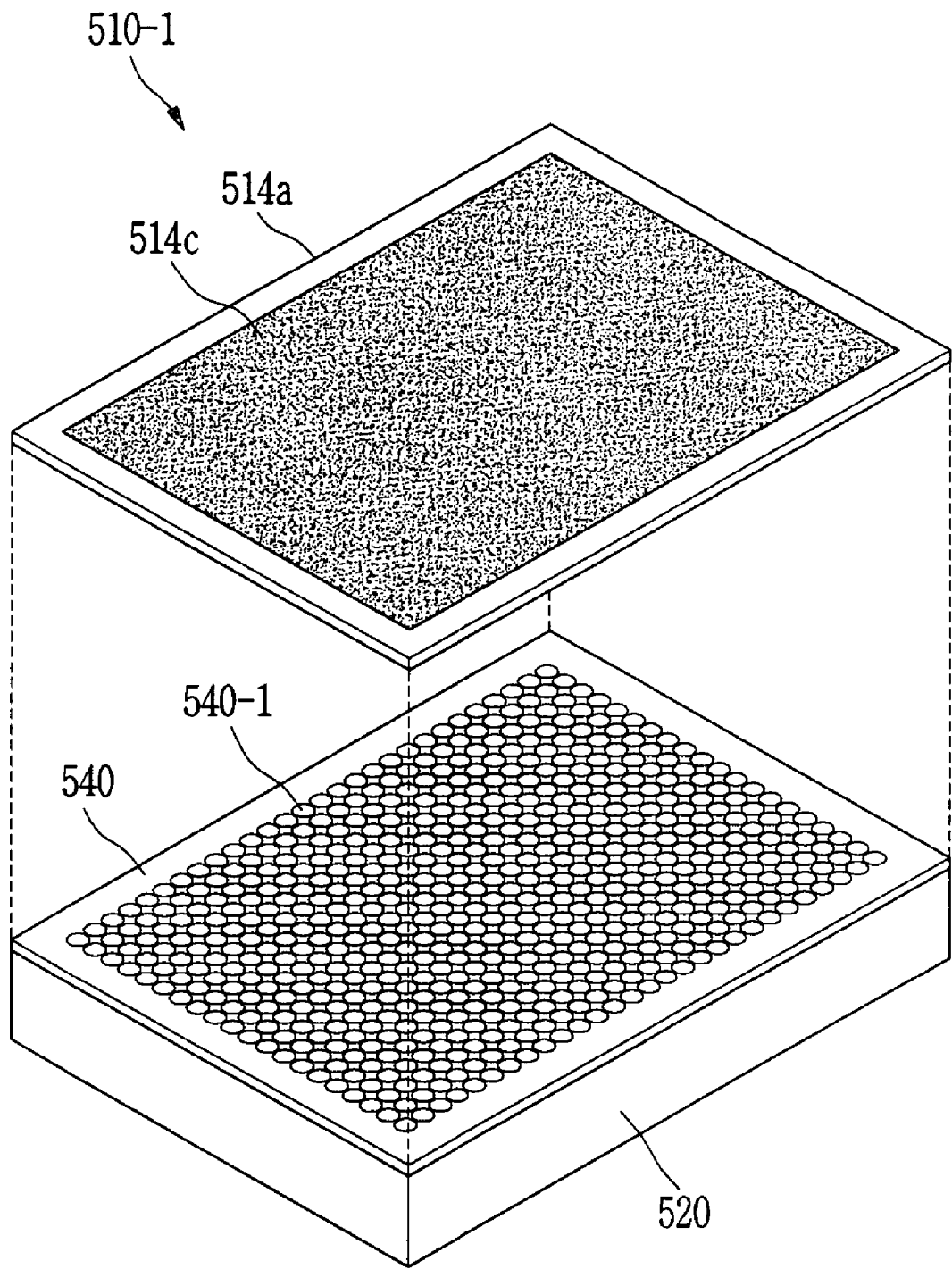
FIG. 9 is an exploded perspective view of the injection nozzle assembly according to an embodiment of the present invention connected to a passive fuel cell.

Referring to FIG. 9, the injection nozzle assembly 540-1 provided in the fuel feeder 540 may have a structure similar to the injection nozzle assembly 40, 140, 240 or 340.

For example, the inlet 40a of the injection nozzle assembly 40 may be opened toward the fuel storage tank 520, and the outlet 40b of the injection nozzle assembly 40 may be opened toward the surface of the anode electrode 514b. The hydrogen-containing fuel stored in the fuel storage tank 520 is introduced into an accommodating space A formed in the housing 42 of the injection nozzle assembly 40 through the inlet 40a by a capillary effect or the like. The hydrogen-containing fuel introduced in the accommodating space A is discharged toward the anode electrode through the outlet 40b by an injection means, e.g., a vibration plate 48 in the housing 42.

Further, the inside of the outlet 40b is coated with a first reforming catalytic layer 44a, so that the hydrogen-containing fuel in the quasi-transformed state is discharged toward the anode electrode 514b. Therefore, hydrogen ions and electrons can be easily generated from the quasi-reformed fuel in the anode electrode 514b.

While the invention has been described in connection with certain exemplary embodiments, it is to be understood by those skilled in the art that the invention is not limited to the disclosed embodiments, but, rather, is intended to cover various modifications included within the sprit and scope of the appended claims and equivalents thereof.

What is claimed is:

1. A fuel cell system comprising:
a fuel storage tank for storing hydrogen-containing fuel;
a membrane electrode assembly comprising a polymer membrane and first and second catalytic layers provided on first and second sides of the polymer membrane, respectively; and
a fuel feeder provided to allow fluid communication between the fuel storage tank and the first catalytic layer formed on the first side of the polymer membrane;
wherein the fuel feeder comprises an injection nozzle assembly having a housing defining a fuel chamber for accommodating the hydrogen-containing fuel supplied from the fuel storage tank, the housing having a first side formed with an outlet through which the hydrogen-containing fuel accommodated in the fuel chamber is discharged, a reforming catalytic layer coated on an inside surface of the housing and an injection means for discharging the hydrogen-containing fuel toward the outlet, the injection means provided in the fuel chamber.

2. The fuel cell system according to claim 1, further comprising a reforming catalytic layer coated on the inside of the outlet.

3. The fuel cell system according to claim 1, wherein the injection means comprises an externally powered vibration plate.

4. The fuel cell system according to claim 1, wherein the injection means comprises an externally powered piezo actuator.

5. The fuel cell system according to claim 1, further comprising a heating means for heating the hydrogen-containing fuel, the heating means provided in the housing.

6. The fuel cell system according to claim 1, wherein the injection means comprises a heater to generate gas bubbles in the hydrogen-containing fuel.

7. The fuel cell system according to claim 1, wherein the housing comprises a connection pipe, and wherein the injection means comprises a heating plate to generate gas bubbles in the hydrogen-containing fuel.

8. The fuel cell system according to claim 1, further comprising an oxygen supplier to supply oxygen to the second catalytic layer provided on a second side of the polymer membrane.

9. The fuel cell system according to claim 1, wherein the second catalytic layer provided on the second side of the polymer membrane is exposed to air.

10. The fuel cell system according to claim 1, wherein the reforming catalytic layer comprises at least one catalytic material selected from the group consisting of Pt, Pd, Ru, Rh, Ir, Cu, Cr, Mo, W and Co.

* * * * *